(12) United States Patent
Ferriss (10) Patent No.: US 8,087,200 B1
(45) Date of Patent: Jan. 3, 2012

(54) FISHING LURE WEIGHT

(76) Inventor: Jimmy A. Ferriss, DeRidder, LA (US)

( * ) Notice: Subject to any disclaimer, the term of this patent is extended or adjusted under 35 U.S.C. 154(b) by 0 days.

(21) Appl. No.: 12/802,939

(22) Filed: Jun. 17, 2010

(51) Int. Cl.
*A01K 85/00* (2006.01)
*A01K 95/00* (2006.01)

(52) U.S. Cl. ............ 43/42.39; 43/44.81; 43/43.14; 43/42.22; 43/44.8; 43/57.1; 43/42.24

(58) Field of Classification Search ............ 43/44.81, 43/42.39, 43.1, 42.24, 44.2, 44.4, 44.8, 43.14, 43/42.22, 57.1, 57.2, 54.1, 25.2; 411/533
See application file for complete search history.

(56) References Cited

U.S. PATENT DOCUMENTS

| | | | | |
|---|---|---|---|---|
| 745,066 A | * | 11/1903 | Koch | 43/44.81 |
| 746,006 A | * | 12/1903 | Brigham | 411/533 |
| 775,727 A | * | 11/1904 | Koch | 43/44.81 |
| 1,295,370 A | * | 2/1919 | Porter | 43/44.81 |
| 1,850,039 A | * | 3/1932 | Townsend | 43/57.1 |
| 2,119,520 A | * | 6/1938 | Brokering | 411/352 |
| 2,169,182 A | * | 8/1939 | Kost | 411/437 |
| 2,172,258 A | * | 9/1939 | Place | 411/437 |
| 2,185,666 A | * | 1/1940 | Hill, Jr. | 43/44.81 |
| 2,257,959 A | * | 10/1941 | Hoppenstand | 411/134 |
| 2,273,582 A | * | 2/1942 | Maire | 43/44.8 |
| 2,292,592 A | * | 8/1942 | Wright | 43/42.39 |
| 2,339,187 A | * | 1/1944 | Pain | 43/57.1 |
| 2,470,927 A | * | 5/1949 | Hale, Jr. | 411/353 |
| 2,474,176 A | * | 6/1949 | Wenck | 43/25.2 |
| 2,482,881 A | * | 9/1949 | Sonner, Jr. | 43/57.1 |
| 2,492,557 A | * | 12/1949 | Deimler | 43/44.8 |
| 2,517,375 A | * | 8/1950 | Anderson | 43/43.14 |
| 2,540,276 A | * | 2/1951 | Moler | 43/44.2 |
| 2,771,704 A | * | 11/1956 | Biggs | 43/57.1 |
| 2,782,550 A | * | 2/1957 | Bretl | 43/44.4 |
| 2,795,885 A | * | 6/1957 | Imberti | 43/44.4 |
| 2,910,800 A | * | 11/1959 | Cicala | 43/42.37 |
| 2,932,118 A | * | 4/1960 | Jend | 43/57.1 |
| 3,034,250 A | * | 5/1962 | Laba | 43/44.8 |
| 3,114,984 A | * | 12/1963 | Atton | 43/44.9 |
| 3,163,958 A | * | 1/1965 | Quinn | 43/44.8 |
| 3,180,052 A | * | 4/1965 | Malesko | 43/43.14 |
| 3,230,659 A | * | 1/1966 | Colling | 43/57.1 |
| 3,292,298 A | * | 12/1966 | Mullikin | 43/25.2 |
| 3,363,357 A | * | 1/1968 | Sokol | 43/42.4 |
| 3,604,141 A | * | 9/1971 | Spencer | 43/44.81 |
| 3,638,347 A | * | 2/1972 | Kochevar | 43/44.81 |
| 3,736,691 A | * | 6/1973 | Gist | 43/44.8 |
| 3,863,383 A | * | 2/1975 | Lore | 43/44.8 |
| 3,892,031 A | * | 7/1975 | Bisbing | 411/531 |
| 3,999,326 A | * | 12/1976 | Wolf | 43/44.81 |
| 4,121,368 A | * | 10/1978 | Norwood | 43/57.1 |
| 4,195,542 A | * | 4/1980 | Zimmer | 411/531 |
| 4,303,001 A | * | 12/1981 | Trungold | 411/531 |
| 4,483,648 A | * | 11/1984 | Trungold | 411/531 |
| 4,873,780 A | * | 10/1989 | Lancette | 43/25.2 |

(Continued)

FOREIGN PATENT DOCUMENTS

JP     05056734 A  *  3/1993

(Continued)

*Primary Examiner* — Darren W Ark (74) *Attorney, Agent, or Firm* — R. Keith Harrison (57) ABSTRACT

A fishing lure weight includes a weight body, a hook tip opening extending through the weight body and a barb notch extending through the weight body and communicating with the hook tip opening.

3 Claims, 12 Drawing Sheets

U.S. PATENT DOCUMENTS

| | | | | |
|---|---|---|---|---|
| 4,893,430 A * | 1/1990 | Barfield | | 43/42.24 |
| 5,038,513 A * | 8/1991 | Hardin | | 43/44.8 |
| 5,201,627 A * | 4/1993 | Biedenbach | | 411/531 |
| 5,220,743 A * | 6/1993 | McClellan | | 43/44.81 |
| 5,222,321 A * | 6/1993 | Lu | | 43/44.81 |
| 5,335,443 A * | 8/1994 | Grigsby, Jr. | | 43/44.81 |
| D370,048 S * | 5/1996 | Smith | | D22/144 |
| 5,839,868 A * | 11/1998 | Kloian | | 411/533 |
| 5,901,494 A * | 5/1999 | Reed | | 43/44.81 |
| 6,895,711 B1 * | 5/2005 | Nakamichi | | 43/42.24 |
| D519,599 S * | 4/2006 | Smith | | D22/144 |
| 7,036,266 B2 * | 5/2006 | Falcon | | 43/44.81 |
| 7,043,872 B2 * | 5/2006 | Cheek, Jr. | | 43/57.2 |
| 7,299,583 B2 * | 11/2007 | Adams | | 43/25.2 |
| 7,490,432 B2 * | 2/2009 | Gillihan | | 43/44.8 |
| 7,788,844 B1 * | 9/2010 | Ruzicka | | 43/57.1 |
| 2006/0048439 A1 * | 3/2006 | Usui | | 43/42.39 |
| 2006/0236587 A1 * | 10/2006 | Rankine | | 43/25.2 |
| 2007/0234635 A1 * | 10/2007 | Lewis | | 43/44.81 |
| 2010/0325938 A1 * | 12/2010 | Gillihan | | 43/44.4 |
| 2011/0014010 A1 * | 1/2011 | DeGraan | | 411/533 |
| 2011/0056115 A1 * | 3/2011 | Sebile | | 43/44.81 |

FOREIGN PATENT DOCUMENTS

| | | | | |
|---|---|---|---|---|
| JP | 08019358 A | * | 1/1996 | |
| JP | 2000069892 A | * | 3/2000 | |
| JP | 2000083542 A | * | 3/2000 | |
| JP | 2005013207 A | * | 1/2005 | |
| JP | 2005218344 A | * | 8/2005 | |
| JP | 2005328701 A | * | 12/2005 | |
| JP | 2006115747 A | * | 5/2006 | |
| JP | 2006325468 A | * | 12/2006 | |
| JP | 2007129999 A | * | 5/2007 | |
| WO | WO 9602133 A1 | * | 2/1996 | |

* cited by examiner

FISHING LURE WEIGHT

FIELD

The disclosure generally relates to fishing lures. More particularly, the disclosure relates to a fishing lure weight one or multiple ones of which can be expeditiously and securely placed on a fishing hook to impart a selected weight to a fishing lure and can be quickly and easily removed from the fishing hook as desired.

BACKGROUND

A variety of fishing lures are known in the art for attracting fish or other aquatic creatures. Live fishing lures include a live bait such as a minnow or cricket which is impaled on a hook that may be tied on the end of a fishing line. In some applications, the fishing line may be wound on a crank-operated reel provided on a fishing rod. Artificial fishing lures commonly include a hard or soft plastic lure body which is shaped and colored to resemble the appearance of a worm, crawfish, shad or other aquatic creature and may be fitted with one or multiple fishing hooks. The lure body is typically tied on the end of the fishing line. Accordingly, the fishing rod is typically used to cast the live or artificial fishing lure into a lake or other water body after which the reel is operated to retrieve the fishing lure through the water body to attract fish to the lure.

Conventional artificial fishing lures commonly have a lightweight hard or soft plastic or other construction. Live fishing lures such as minnows or crickets may also be lightweight. Therefore, the lures may not impart significant weight to the fishing line and thus, may only be cast for short distances from a fishing rod. Moreover, after casting, the fishing lures may have a tendency to float instead of sinking to the bottom of the water body as may be desirable in some applications. In many applications, therefore, it may be necessary or desirable to place one or multiple weights on the fishing hook or on the fishing line near the point of attachment with the fishing hook to increase the weight of the fishing lure. Increasing the weight of the fishing lure may increase the casting distance of the lure as well as enhance the tendency of the lure to sink in the water body.

One of the fishing lure weights which is most commonly used with live fishing lures is a rounded lead bead having a slot which receives the fishing line typically near the point of attachment of the fishing line to the fishing hook. The bead is crimped against the fishing line using pliers or the like to secure the weight to the line. The increased weight of the fishing lure correspondingly increases the casting distance of the lure as well as the tendency of the lure to sink in the water body. One or multiple beads can be placed on the fishing line depending on the desired weight and the desired casting and sinking characteristics of the fishing lure.

One drawback of the conventional beaded fishing lure weight is that the weight typically requires the use of pliers to crimp the bead onto the fishing line. Moreover, the bead may have a tendency to inadvertently become detached from the fishing line during casting or retrieval of the lure through the water body. In the case of lead weights, inadvertent detachment from the fishing line may have an undesirable environmental impact. Additionally, after it is crimped onto the fishing line, the bead may not be readily removed from the fishing line if desired. Other types of conventional fishing lure weights, such as slip sinkers which are typically used with artificial fishing lures, may be cumbersome to place on and remove from the fishing hook or line.

Accordingly, a fishing lure weight one or multiple ones of which can be expeditiously and securely placed on a fishing hook to impart a selected weight to a fishing lure and can be quickly and easily removed from the hook as desired is needed.

SUMMARY

The disclosure is generally directed to a fishing lure weight. An illustrative embodiment of the fishing lure weight includes a weight body, a hook tip opening extending through the weight body and a barb notch extending through the weight body and communicating with the hook tip opening.

The disclosure is further generally directed to a weighted fishing hook assembly. An illustrative embodiment of the weighted fishing hook assembly includes a fishing hook having a hook barb and a hook tip; at least one fishing lure weight carried by the fishing hook and having a weight body, a hook tip opening extending through the weight body and receiving the fishing hook and a barb notch extending through the weight body and communicating with the hook tip opening; and a fishing lure carried by the fishing hook.

The disclosure is further generally directed to a method of weighting a fishing hook. An illustrative embodiment of the method includes providing a fishing hook having a hook barb and a hook tip; providing at least one fishing lure weight having a weight body with a hook tip opening and a barb notch communicating with the hook tip opening; and placing the at least one fishing lure weight on the fishing hook by aligning the hook tip opening and the barb notch of the at least one fishing lure weight with the hook tip and the hook barb, respectively, of the fishing hook; inserting the hook tip and the hook barb of the fishing hook through the hook tip opening and the barb notch, respectively, of the at least one fishing lure weight; sliding the at least one fishing lure weight onto the fishing hook; and misaligning the barb notch of the at least one fishing lure weight with the hook barb of the fishing hook by rotating the fishing lure weight.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 6:
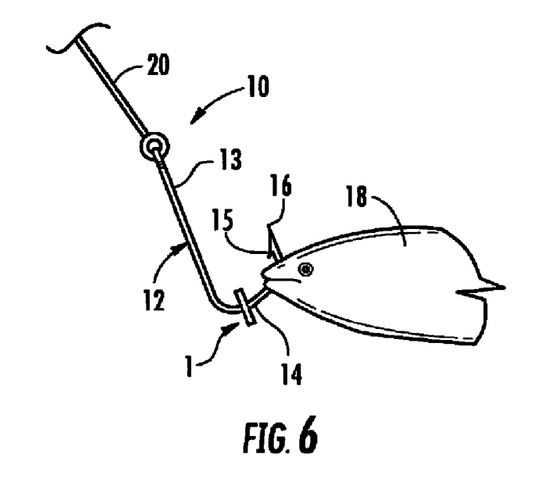
FIG. 6 is a side view of an illustrative embodiment of the fishing lure weight, placed on a fishing hook with a lure (partially in section) impaled on the fishing hook.
Figure 7:
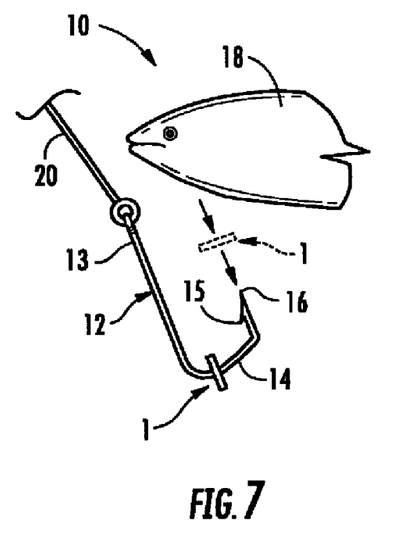
FIG. 7 is an exploded side view illustrating placement of the fishing lure weight on the fishing hook and impaling of the lure (partially in section) on the fishing hook.
Figure 12:
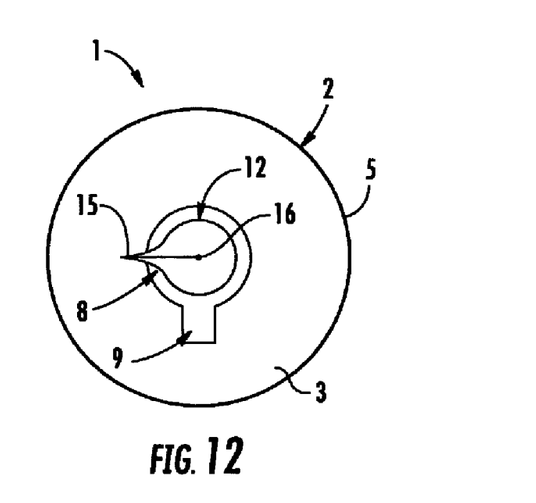
FIG. 12 is a front view of an illustrative embodiment of the fishing lure weight, more particularly illustrating insertion of the shank bend of the fishing hook through the hook tip opening and misalignment of the barb notch in the fishing lure weight with the hook barb of the fishing hook to secure the fishing lure weight on the fishing hook.
Figure 13:
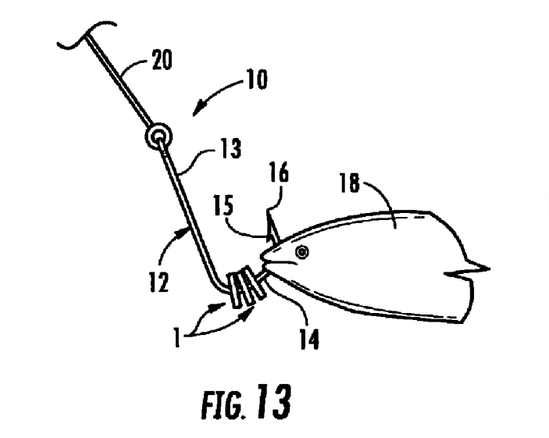
FIG. 13 is a side view of an illustrative embodiment of multiple fishing lure weights, placed on a fishing hook with a lure (partially in section) impaled on the fishing hook.

Referring initially to FIGS. 1-16 of the drawings, an illustrative embodiment of the fishing lure weight is generally indicated by reference numeral 1 in FIGS. 1-13. As illustrated in FIGS. 6, 7 and 13 of the drawings, in exemplary application which will be hereinafter further described, at least one fishing lure weight 1 may be securely placed on a fishing hook 12 for the purpose of quickly, easily and incrementally imparting a selected weight to the fishing hook 12. The fishing hook 12 may be part of a weighted fishing hook assembly 10 which is attached to a fishing line 20. In some applications, the fishing line 20 may be wound on a crank-operated reel (not illustrated) which is provided on a fishing rod (not illustrated), such as in the conventional manner. A fishing lure 18, which may be live or artificial, may be impaled on the fishing hook 12. The fishing lure weight or weights 1 may be quickly and easily removed from the fishing hook 12 as desired to selectively and incrementally decrease the weight of the weighted fishing hook assembly 10 according to the preferences or requirements of the user of the fishing rod, as will be hereinafter further described. The fishing lure weight 1 may be applicable to any type of fishing lure having a single fishing hook 12. These include but are not limited to plastic lures (worms or other swim baits), spinnerbaits and jigs.

Figure 16:
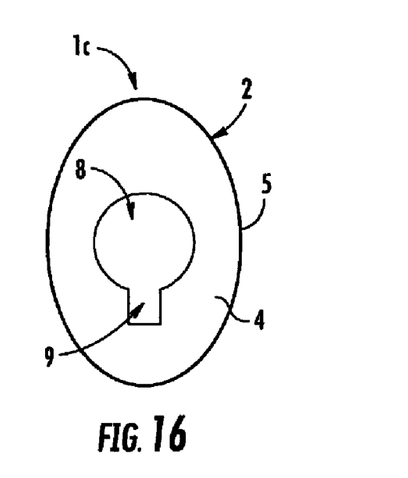
FIG. 16 is a front view of still another alternative illustrative embodiment of the fishing lure weight.

The fishing lure weight 1 has a weight body 2 which in some embodiments may be generally circular or disc-shaped, as illustrated in FIGS. 1-5. As illustrated in FIG. 16, in some alternative embodiments of the fishing lure weight, generally indicated by reference numeral 1c, the weight body 2 may have a generally elongated or elliptical egg, teardrop or other shape. In other alternative embodiments, the weight body 2 may have a generally polygonal or other shape. Accordingly, in the various embodiments, the weight body 2 may have any shape which is consistent with the functional requirements of the fishing lure weight which will be hereinafter described. In some embodiments, the weight body 2 may be a metal such as tungsten, brass, aluminum or steel, for example and without limitation. In other embodiments, the weight body 2 may be a non-metallic material or any non-buoyant weighted material which is consistent with the functional requirements of the fishing lure weight. The weight body 2 may have any desirable weight depending on the intended application of the fishing lure weight 1. Accordingly, the size and material of the weight body 2 may be selected to impart the desired weight to the fishing lure weight 1.

The weight body 2 may have a front body surface 3 and a rear body surface 4 which is generally parallel and spaced-apart with respect to the front body surface 3. A side body surface 5 may extend between the front body surface 3 and the rear body surface 4. In the disc-shaped weight body 2 of the fishing lure weight 1, the side body surface 5 may have a continuous annular contour. The front body surface 3 and the rear body surface 4 may each be generally flat or planar.

A hook tip opening 8 extends through the weight body 2. The hook tip opening 8 may open to the front body surface 3 and the rear body surface 4 of the weight body 2. In some embodiments, the hook tip opening 8 may extend centrally through the weight body 2. In other embodiments, the hook tip opening 8 may be offset or eccentric with respect to the center of the weight body 2.

Figure 1:
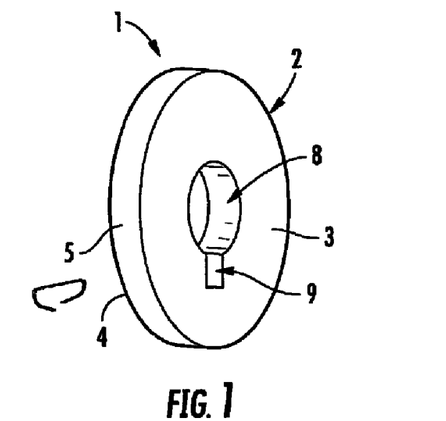
FIG. 1 is a front perspective view of an illustrative embodiment of the fishing lure weight.
Figure 2:
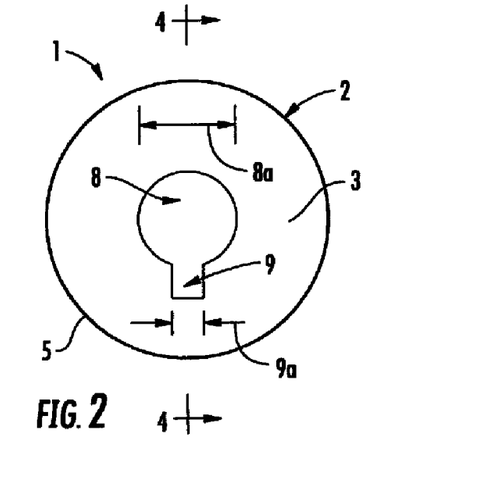
FIG. 2 is a front view of an illustrative embodiment of the fishing lure weight.
Figure 3:
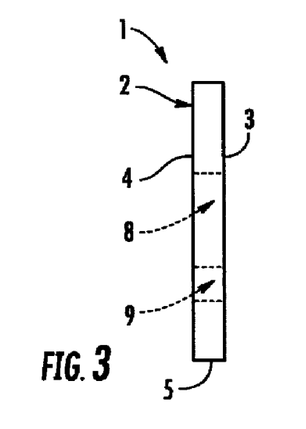
FIG. 3 is a side view of an illustrative embodiment of the fishing lure weight.
Figure 4:
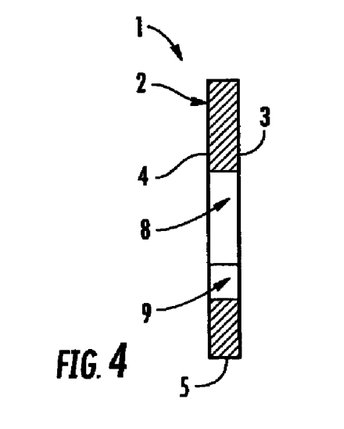
FIG. 4 is a sectional view, taken along section lines 4-4 in FIG. 2, of an illustrative embodiment of the fishing lure weight.
Figure 5:
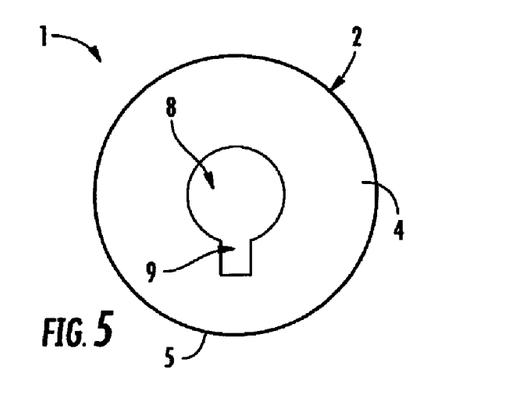
FIG. 5 is a rear view of an illustrative embodiment of the fishing lure weight.
Figure 14:
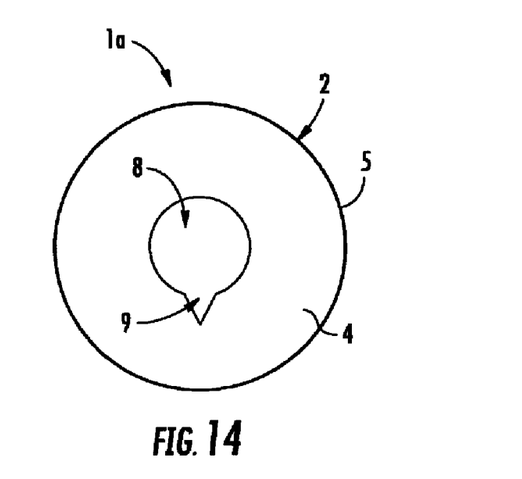
FIG. 14 is a front view of an alternative illustrative embodiment of the fishing lure weight.
Figure 15:
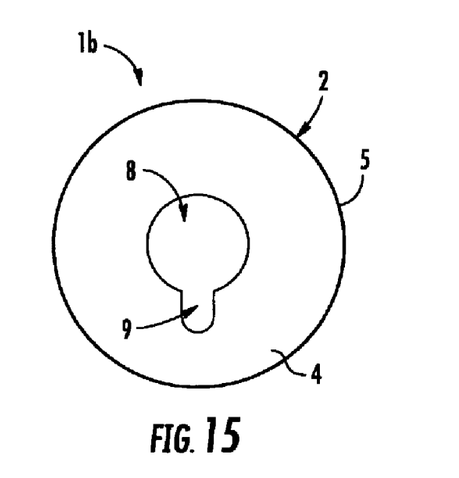
FIG. 15 is a front view of another alternative illustrative embodiment of the fishing lure weight.

A barb notch 9 extends through the weight body 2 and may open to the front body surface 3 and the rear body surface 4 of the weight body 2. The barb notch 9 communicates with the hook tip opening 8. As illustrated in FIG. 2, the barb notch 9 may have a barb notch width 9a which is less than a hook tip opening width 8a of the hook tip opening 8. As illustrated in FIGS. 1-5, in some embodiments the barb notch 9 of the fishing lure weight 1 may have a generally square or rectangular shape. As illustrated in FIG. 14, in other embodiments, the barb notch 9 of the fishing lure weight 1a may have a generally V-shape. As illustrated in FIG. 15, in other embodiments, the barb notch 9 of the fishing lure weight 1b may have a generally rounded or tubular shape. The barb notch 9 may have any other shape which is consistent with the functional requirements of the fishing lure weight which will be hereinafter described.

As illustrated in FIGS. 6-13, in exemplary application at least one fishing lure weight 1 is placed on a fishing hook 12 to assemble a weighted fishing hook assembly 10 having a selected weight. The fishing hook 12 may have a conventional single-hook design including a generally elongated fishing hook shank 13 with a shank bend 14. A hook tip 16 and a hook barb 15 may terminate the shank bend 14. The fishing hook shank 13 may be tied to a fishing line 20. In some applications, the fishing line 20 may be wound on a crank-operated spool (not illustrated) which is provided on a fishing rod (not illustrated), such as in the conventional manner, to facilitate casting of the weighted fishing hook assembly 10 into a lake or other water body (not illustrated) using the fishing rod. A fishing lure 18, which may be live or artificial, may be impaled on the shank bend 14 of the fishing hook 12 after the fishing lure weight or weights 1 is/are placed on the shank bend 14. As illustrated in FIGS. 6 and 7, in some applications, a single fishing lure weight 1 may be placed on the fishing hook 12 to impart a desired weight to the weighted fishing hook assembly 10. The weight of the weighted fishing hook assembly 10 may include the sum of the weights of the fishing hook 12, the fishing lure weight 1 and the fishing lure 18. As illustrated in FIG. 13, in some applications, two or more fishing lure weights 1 may be individually and sequentially placed on the fishing hook 12 to correspondingly and incrementally increase the weight of the weighted fishing hook assembly 10, according to the preferences or requirements of the user of the fishing rod.

Figure 8:
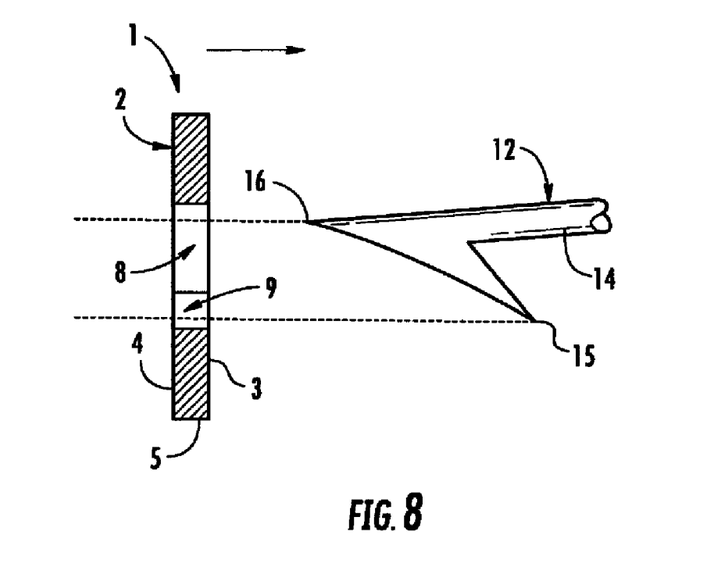
FIG. 8 is a sectional view of an illustrative embodiment of the fishing lure weight, more particularly illustrating alignment of a hook tip and a hook barb on a fishing hook (partially in section) with a hook tip opening and a barb notch, respectively, in the fishing lure weight in placement of the fishing lure weight on the fishing hook.
Figure 9:
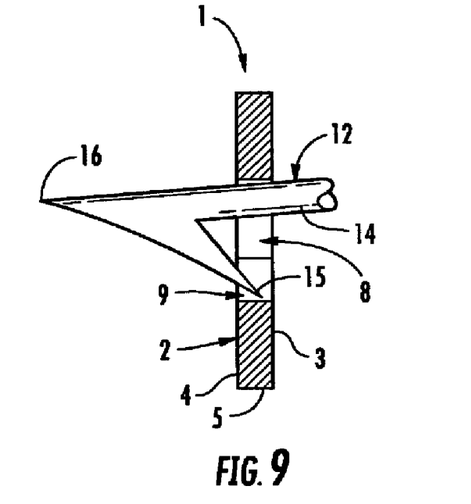
FIG. 9 is a sectional view of an illustrative embodiment of the fishing lure weight, more particularly illustrating insertion of the hook tip and the hook barb on the fishing hook (partially in section) through the hook tip opening and the barb notch, respectively, in the fishing lure weight as the fishing lure weight is placed on the fishing hook.
Figure 10:
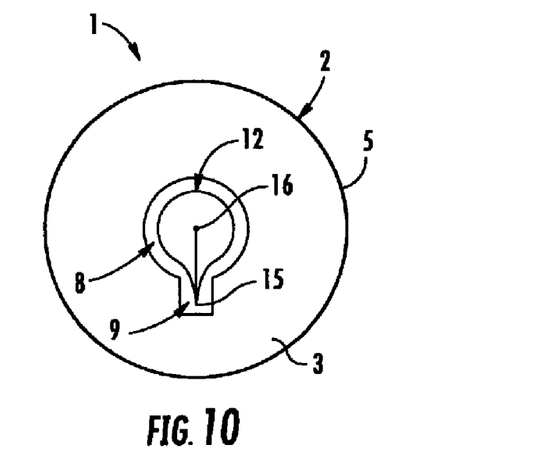
FIG. 10 is a front view of an illustrative embodiment of the fishing lure weight, more particularly illustrating insertion of the hook tip and the hook barb on the fishing hook (partially in section) through the hook tip opening and the barb notch, respectively, in the fishing lure weight as the fishing lure weight is placed on the fishing hook.
Figure 11:
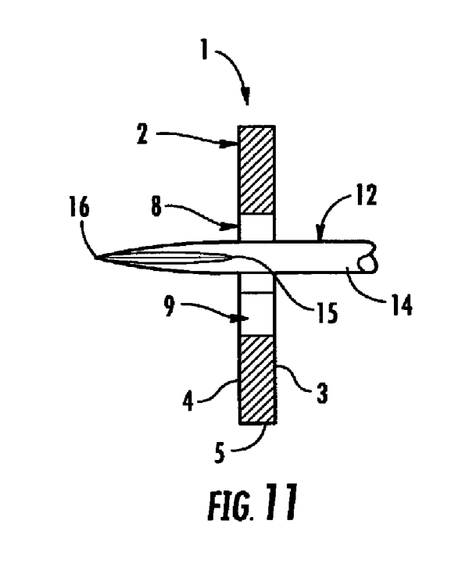
FIG. 11 is a sectional view of an illustrative embodiment of the fishing lure weight, more particularly illustrating insertion of a shank bend of the fishing hook through the hook tip opening and misalignment of the barb notch in the fishing lure weight with the hook barb of the fishing hook to secure the fishing lure weight on the fishing hook.

Each fishing lure weight 1 may be placed on the fishing hook 12 as follows. As illustrated in FIG. 8, the fishing lure weight 1 is initially positioned in front of the hook tip 16 of the fishing hook 12 with the hook tip opening 8 and the barb notch 9 of the weight body 2 aligned with the hook tip 16 and the hook barb 15, respectively, of the fishing hook 12. As indicated by the arrow in FIG. 8, the fishing lure weight 1 is next slid onto the shank bend 14 of the fishing hook 12 as the hook tip 16 and the hook barb 15 of the fishing hook 12 pass through the hook tip opening 8 and the barb notch 9, respectively, of the fishing lure weight 1, as illustrated in FIGS. 9 and 10. As the fishing lure weight 1 continues to be slid onto the shank bend 14, the hook barb 15 passes completely through and eventually clears the barb notch 9. As illustrated in FIGS. 11 and 12, the lure body 2 of the fishing lure weight 1 (or alternatively, the fishing hook 12) is next rotated clockwise or counterclockwise to misalign the barb notch 9 of the lure body 2 with respect to the hook barb 15 of the fishing hook 12. Finally, the fishing lure 18 may be impaled on the shank bend 14 of the fishing hook 12 typically in the conventional manner.

The weighted fishing hook assembly 10 can be cast and retrieved on the fishing line 20 using the fishing rod (not illustrated) to which the fishing line 20 is attached typically by operation of a crank-actuated reel (not illustrated) in the conventional manner. The weight which is imparted to the fishing hook 12 by the fishing lure weight or weights 1 may increase the casting distance of the fishing lure 18 as the weighted fishing hook assembly 10 is cast from the fishing rod (not illustrated) on the fishing line 20 into a lake or other water body (not illustrated). Additionally, the added weight of the fishing hook 12 may enhance the tendency of the fishing lure 18 to sink in the water body after the weighted fishing hook assembly 10 is cast. It will be appreciated by those skilled in the art that due to misalignment of the barb notch 9 of the weight body 2 relative to the hook barb 15 of the fishing hook 12, as illustrated in FIGS. 11 and 12, the lure body 2 is essentially secured onto the shank bend 14 of the fishing hook 12. Therefore, in the event that the fishing lure 18 is inadvertently detached from the fishing hook 12 during casting or retrieval of the weighted fishing lure 1, the fishing lure weight 1 is unlikely to inadvertently slip from the fishing hook 12. It will be further appreciated by those skilled in the art that any desired number of fishing lure weights 1 can be placed on or removed from the fishing hook 12 to achieve the desired casting and sinking characteristics which is largely a function of the weight of the weighting fishing hook assembly 10.

Figure 17:
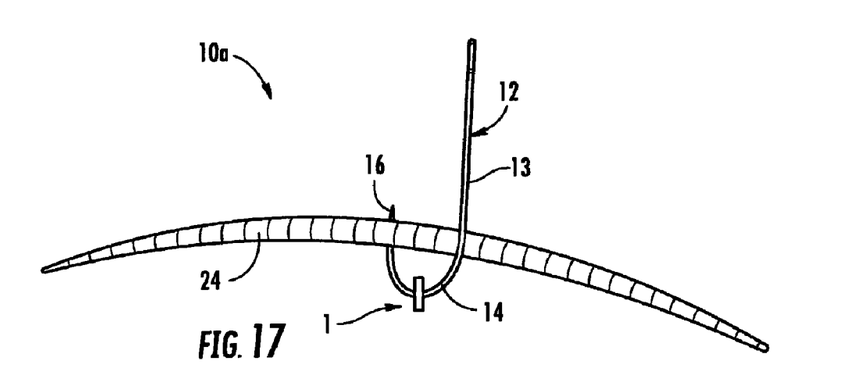
FIG. 17 is a side view of an illustrative embodiment of the fishing lure weight, placed on a fishing hook with a worm-type artificial lure (partially in section) impaled on the fishing hook in a "Wacky Style" rigging configuration.

Referring next to FIG. 17 of the drawings, in some applications the weighted fishing hook assembly 10a may include an artificial fishing lure 24 which is impaled on the hook tip 16 of the fishing hook 12. In some applications, the artificial fishing lure 24 may be a plastic worm which is placed on the fishing hook in a "Wacky Style" rigging configuration, as illustrated. In other applications, the artificial fishing lure 24 may be a frog, crawfish or any other aquatic creature which may be used as suitable bait in fishing applications. Accordingly, prior to extending the hook tip 16 through the artificial fishing lure 24, at least one fishing lure weight 1 may be placed on the shank bend 14 of the fishing hook 12 as was heretofore described with respect to FIGS. 8-12. The fishing lure weight or weights 1 can be selectively removed from the fishing hook 12, as was heretofore described, after detaching the hook tip 16 from the artificial fishing lure 24.

Figure 18:
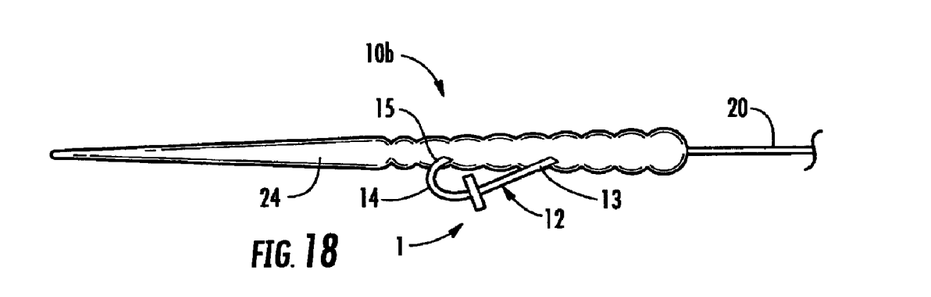
FIG. 18 is a side view of an illustrative embodiment of the fishing lure weight, placed on a fishing hook with the hook tip embedded in an a worm-type artificial lure in a "Texas Style" rigging configuration.

Referring next to FIG. 18 of the drawings, in some applications the weighted fishing hook assembly 10b may include an artificial fishing lure 24 which is configured in a Texas Style configuration, with the fishing hook shank 13 of the fishing hook 12 extending through a portion of the artificial fishing lure 24 and attached to a fishing line 20. The hook tip 16 of the fishing hook 12 is embedded into the artificial fishing lure 24. Accordingly, prior to embedding the hook tip 16 in the artificial fishing lure 24, at least one fishing lure weight 1 may be placed on the shank bend 14 of the fishing hook 12 as was heretofore described with respect to FIGS. 8-12. The fishing lure weight or weights 1 can be selectively removed from the fishing hook 12, as was heretofore described, after detaching the hook tip 16 from the artificial fishing lure 24.

Figure 19:
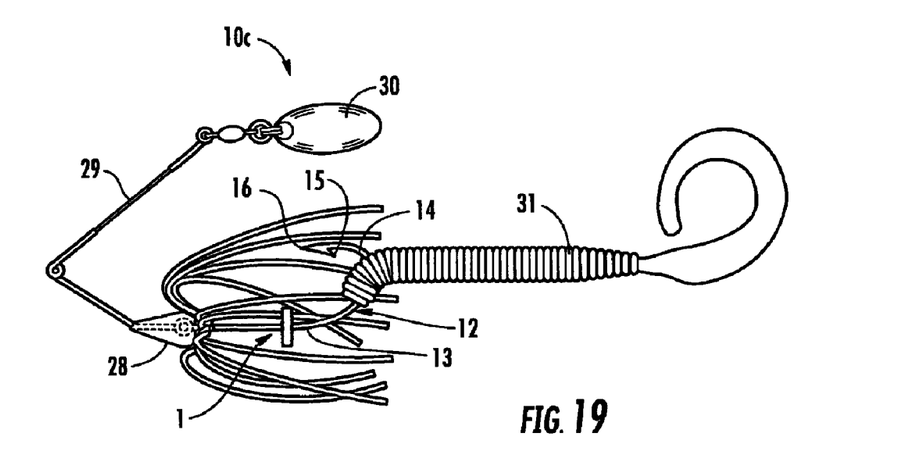
FIG. 19 is a side view of an illustrative embodiment of the fishing lure weight, placed on a fishing hook of a spinner bait with a plastic worm trailer placed on the fishing hook after the fishing lure weight.

Referring next to FIG. 19 of the drawings, in some applications the weighted fishing hook assembly 10c may include a fishing lure which includes a spinner bait 28 having a wire harness 29. At least one spinner blade 30 may be provided on the wire harness 29. A fishing hook 12 may extend rearwardly from the spinner bait 28. At least one fishing lure weight 1 may be placed on the fishing hook shank 13 of the fishing hook 12, as was heretofore described with respect to FIGS. 8-12, after which a trailer 31 may be placed on the fishing hook 12. The fishing lure weight or weights 1 can be selectively removed from the fishing hook 12, as was heretofore described, after removing the trailer 31 from the fishing hook 12.

Figure 19A:
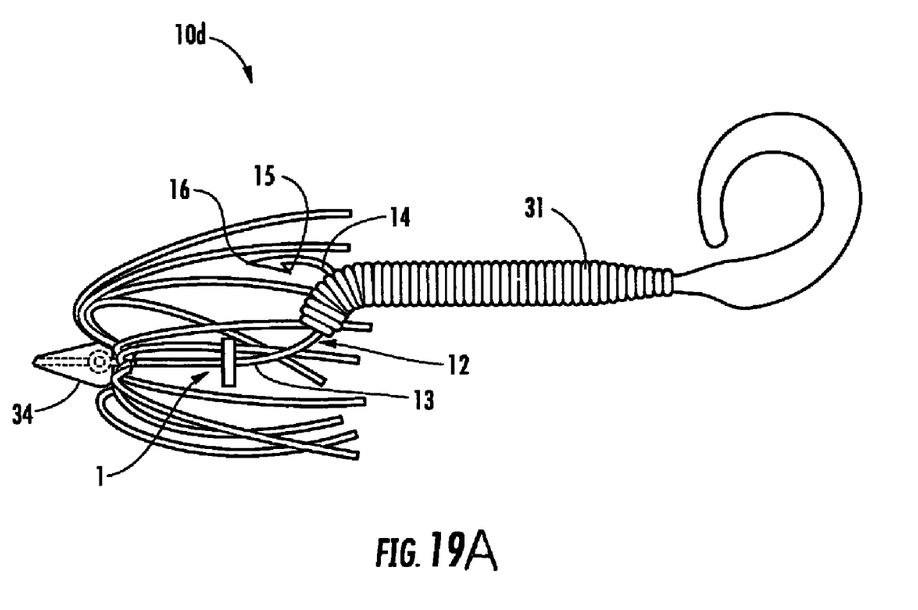
FIG. 19A is a side view of illustrative embodiment of the fishing lure weight, placed on a fishing hook of a jig with a plastic worm trailer placed on the fishing hook after the fishing lure weight.

Referring next to FIG. 19A of the drawings, some applications the weighted fishing hook assembly 10c may include a fishing lure which includes a jig 34 having a fishing hook 12. At least one fishing lure weight 1 may be placed on the fishing hook shank 13 of the fishing hook 12, as was heretofore described with respect to FIGS. 8-12, after which a trailer 31 may be placed on the fishing hook 12. The fishing lure weight or weights 1 can be selectively removed from the fishing hook 12, as was heretofore described, after removing the trailer 31 from the fishing hook 12.

Figure 20:
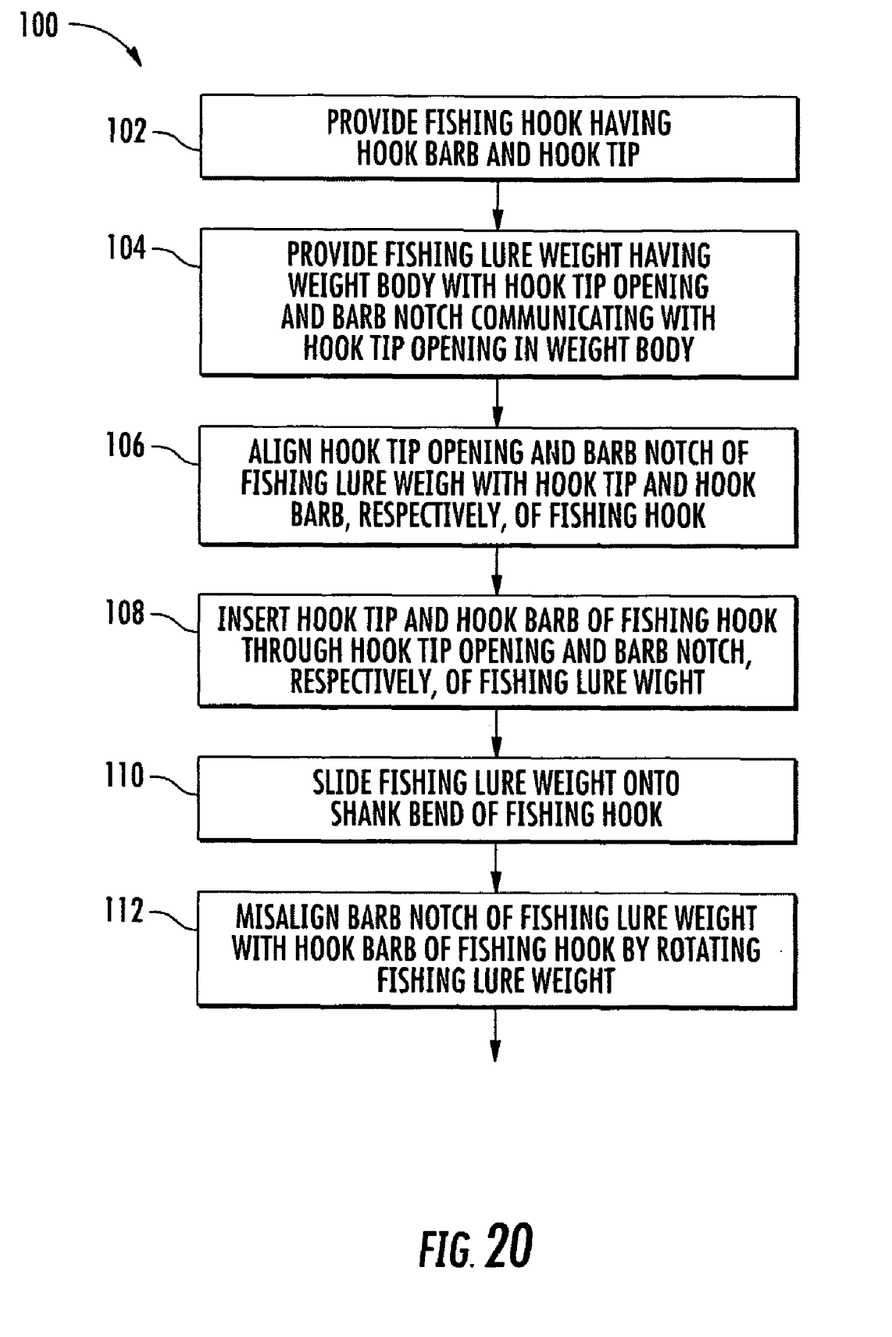
FIG. 20 is a flow diagram of an illustrative embodiment of a method of weighting a fishing hook.

Referring next to FIG. 20 of the drawings, a flow diagram 100 of an illustrative embodiment of a method of weighting a fishing hook is illustrated. In block 102, a fishing hook having a hook barb and a hook tip is provided. In block 104, a fishing lure weight having a weight body with a hook tip opening and a barb notch communicating with the hook tip opening in the weight body is provided. In block 106, the hook tip opening and the barb notch of the fishing lure weight are aligned with the hook tip and the hook barb, respectively, of the fishing hook. In block 108, the hook tip and the hook barb of the fishing hook are inserted through the hook tip opening and the barb notch, respectively, of the fishing lure weight. In block 110, the fishing lure weight is slid onto the shank bend of the fishing hook. In block 112, the barb notch of the fishing lure weight is misaligned with the hook barb of the fishing hook by rotating the fishing lure weight or the fishing hook to secure the fishing lure weight on the fishing hook. In block 114, in some applications at least one additional fishing lure weight may be placed on the fishing hook by repeating blocks 100-112. In block 116, a live or artificial fishing lure may be impaled on the fishing hook. In some applications, the fishing lure may be configured in a "Wacky Style" rigging configuration. In block 118, the fishing hook and fishing lure may be cast and retrieved using a rod and reel.

In blocks 120-124, at least one fishing lure weight may be removed from the fishing hook to correspondingly reduce the weight of the fishing hook. In block 120, the fishing lure may be removed from the fishing hook. In block 122, the barb notch of at least one fishing lure weight may be aligned with the hook barb of the fishing hook by rotating the fishing lure weight or the fishing hook. In block 124, the fishing lure weight may be removed from the fishing hook by passing the hook barb of the fishing hook through the barb notch of the fishing lure weight.

Figure 21:
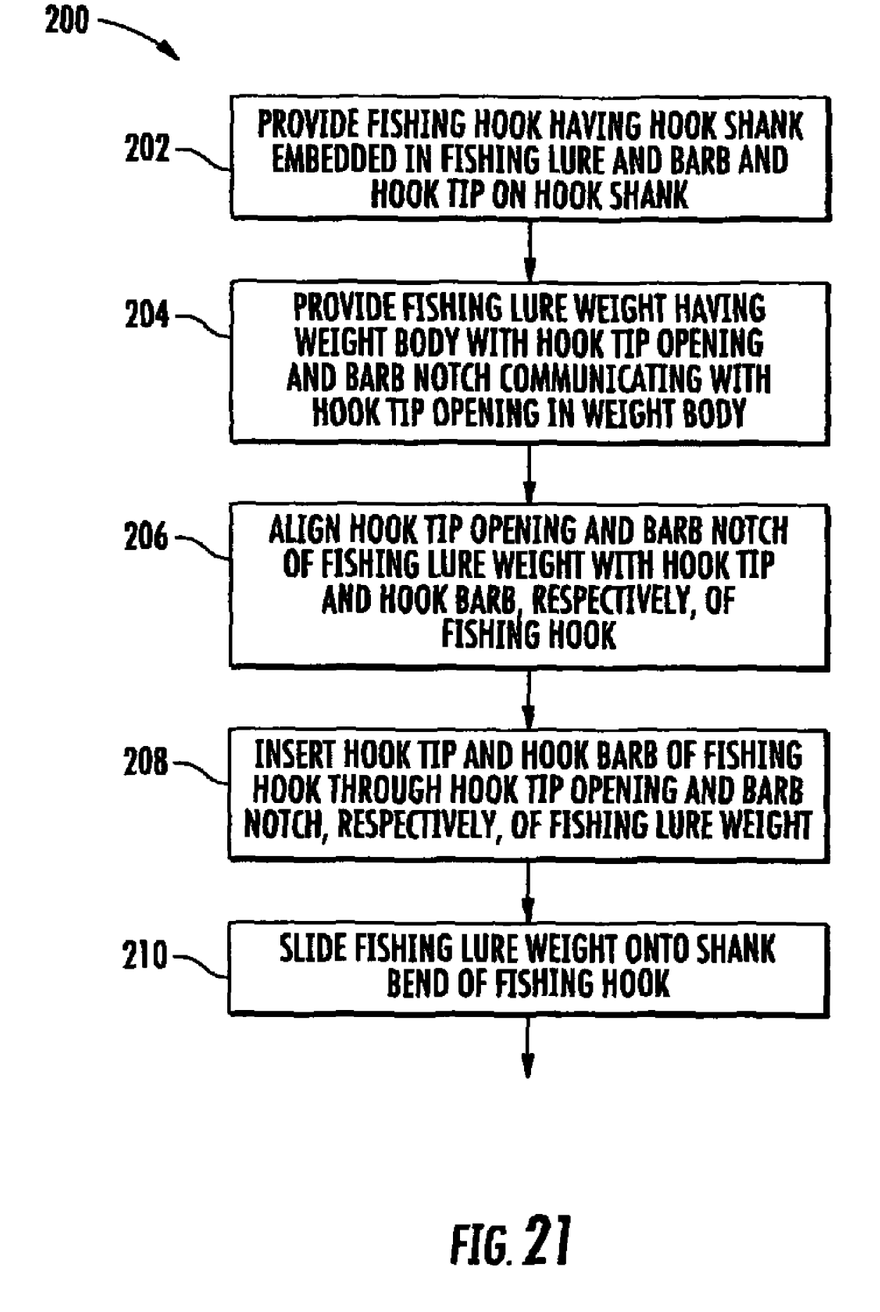
FIG. 21 is a flow diagram of an alternative illustrative embodiment of a method of weighting a fishing hook on a Texas rig-style fishing lure.

Referring next to FIG. 21 of the drawings, a flow diagram 200 of an alternative illustrative embodiment of a method of weighting a fishing hook on a Texas rig-style fishing lure is illustrated. In block 202, a fishing hook having a hook shank embedded in a fishing lure and a hook barb and a hook tip on the hook shank is provided. In block 204, a fishing lure weight having a weight body with a hook tip opening and a barb notch communicating with the hook tip opening in the weight body is provided. In block 206, the hook tip opening and the barb notch of the fishing lure weight are aligned with the hook tip and the hook barb, respectively, of the fishing hook. In block 208, the hook tip and the hook barb of the fishing hook are inserted through the hook tip opening and the barb notch, respectively, of the fishing lure weight. In block 210, the fishing lure weight is slid onto the shank bend of the fishing hook. In block 212, the barb notch of the fishing lure weight is misaligned with the hook barb of the fishing hook by rotating the fishing lure weight or the fishing hook to secure the fishing lure weight on the fishing hook. In block 214, in some applications at least one additional fishing lure weight may be placed on the fishing hook by repeating blocks 200-212. In block 216, the hook tip of the fishing hook may be embedded in the fishing lure in a "Texas Style" rigging configuration. In block 218, the fishing hook and fishing lure may be cast and retrieved using a rod and reel.

In blocks 220-224, at least one fishing lure weight may be removed from the fishing hook to correspondingly reduce the weight of the fishing hook. In block 220, the fishing lure may be removed from the fishing hook. In block 222, the barb notch of at least one fishing lure weight may be aligned with the hook barb of the fishing hook by rotating the fishing lure weight or the fishing hook. In block 224, the fishing lure weight may be removed from the fishing hook by passing the hook barb of the fishing hook through the barb notch of the fishing lure weight.

Figure 22:
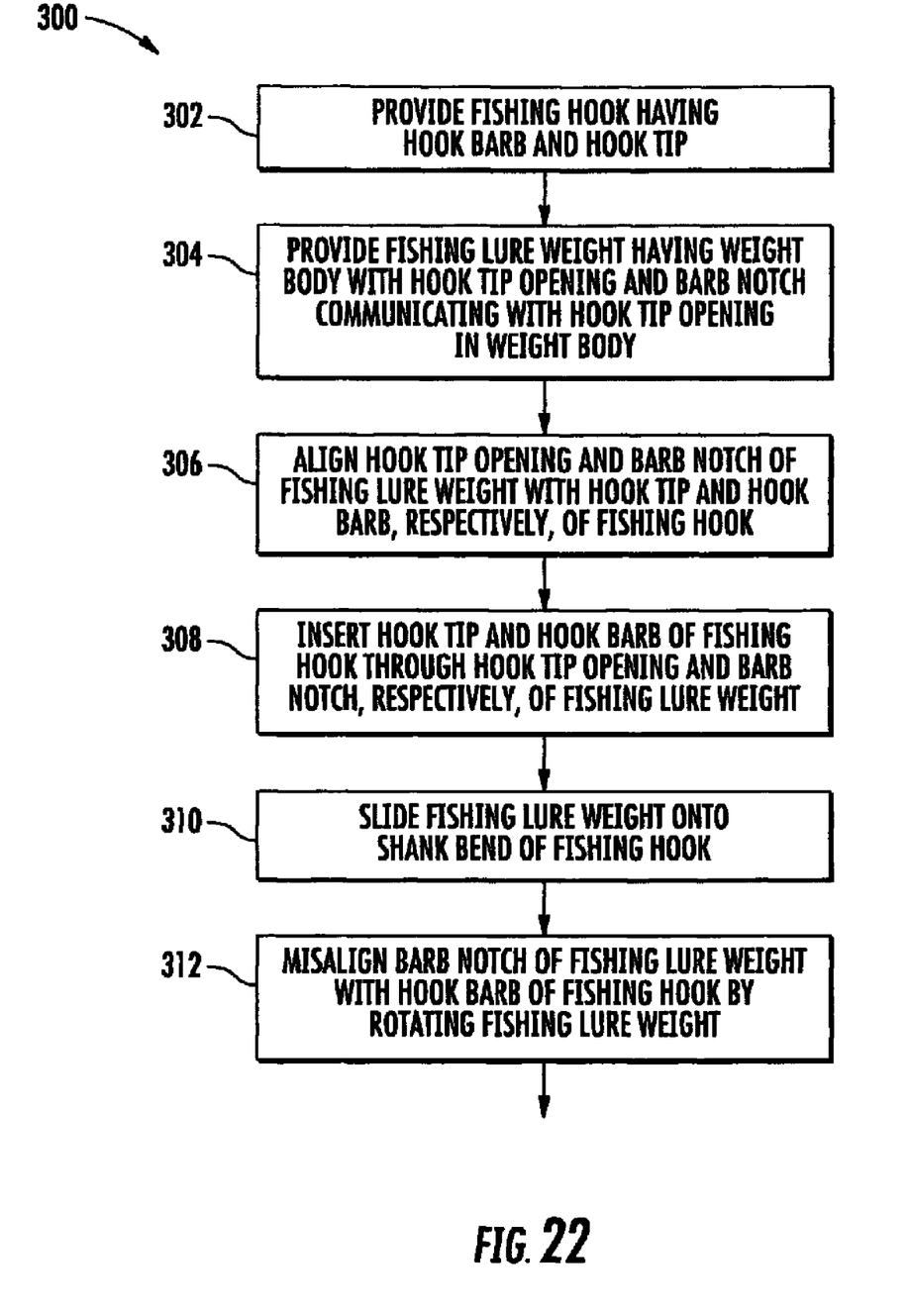
FIG. 22 is a flow diagram of an alternative illustrative embodiment of a method of weighting a fishing hook on a jig-type fishing lure.

Referring next to FIG. 22, a flow diagram 300 of an alternative illustrative embodiment of a method of weighting a fishing hook on a jig-type and/or spinner bait fishing lure is illustrated. In block 302, a fishing hook having a hook barb and a hook tip is provided. In block 304, a fishing lure weight having a weight body with a hook tip opening and a barb notch communicating with the hook tip opening in the weight body is provided. In block 306, the hook tip opening and the barb notch of the fishing lure weight are aligned with the hook tip and the hook barb, respectively, of the fishing hook. In block 308, the hook tip and the hook barb of the fishing hook are inserted through the hook tip opening and the barb notch, respectively, of the fishing lure weight. In block 310, the fishing lure weight is slid onto the shank bend of the fishing hook. In block 312, the barb notch of the fishing lure weight is misaligned with the hook barb of the fishing hook by rotating the fishing lure weight or the fishing hook to secure the fishing lure weight on the fishing hook. In block 314, in some applications at least one additional fishing lure weight may be placed on the fishing hook by repeating blocks 100-112. In block 316, a trailer may be placed on the fishing hook. In block 318, the fishing hook and fishing lure may be cast and retrieved using a rod and reel.

In blocks 320-324, at least one fishing lure weight may be removed from the fishing hook to correspondingly reduce the weight of the fishing hook. In block 320, the trailer may be removed from the fishing hook. In block 322, the barb notch of at least one fishing lure weight may be aligned with the hook barb of the fishing hook by rotating the fishing lure weight or the fishing hook. In block 324, the fishing lure weight may be removed from the fishing hook by passing the hook barb of the fishing hook through the barb notch of the fishing lure weight.

While the preferred embodiments of the disclosure have been described above, it will be recognized and understood that various modifications can be made in the disclosure and the appended claims are intended to cover all such modifications which may fall within the spirit and scope of the embodiments of the disclosure.

What is claimed is:
1. A weighted fishing hook and lure assembly, comprising:
a fishing hook having a line attachment end, fishing hook shank, a shank bend extending from said fishing hook shank, and a hook barb and a hook tip on said shank bend opposite said shank;
at least one fishing lure weight carried by said fishing hook and consisting of:
a weight body having a circular disc shape with a planar first body surface, a planar second body surface and a side body surface extending between said first body surface and said second body surface;

a single circular hook tip opening extending centrally through said weight body and accommodating said shank bend of said fishing hook; and a single V-shaped barb notch extending through said weight body communicating with said hook tip opening, said barb notch having sides which taper toward each other, terminate between said hook tip opening and said side body surface of said weight body, and intersect at a point to define a vertex of the V-shape; and a fishing lure mounted on said fishing hook; and wherein at least one of said shank and said shank bend of said fishing hook extends through at least one of the circular hook tip opening and said barb notch, said at least one fishing lure weight located on said fishing hook between said line attachment end and a location at which said fishing lure is mounted on said fishing hook.

2. The assembly of claim 1 wherein said weight body comprises metal.

3. The fishing lure weight of claim 2 wherein said metal is brass or tungsten.

* * * * *